(12) United States Patent
Kuwano

(10) Patent No.: US 8,773,785 B2
(45) Date of Patent: Jul. 8, 2014

(54) PIEZOELECTRIC ACTUATOR, LENS-BARREL, AND CAMERA

(75) Inventor: Kunihiro Kuwano, Kawasaki (JP)

(73) Assignee: Nikon Corporation, Tokyo (JP)

( * ) Notice: Subject to any disclaimer, the term of this patent is extended or adjusted under 35 U.S.C. 154(b) by 124 days.

(21) Appl. No.: 13/378,168

(22) PCT Filed: Jun. 15, 2010

(86) PCT No.: PCT/JP2010/060072
§ 371 (c)(1),
(2), (4) Date: Dec. 14, 2011

(87) PCT Pub. No.: WO2010/147096
PCT Pub. Date: Dec. 23, 2010

(65) Prior Publication Data
US 2012/0087024 A1   Apr. 12, 2012

(30) Foreign Application Priority Data

Jun. 15, 2009   (JP) .................................. 2009-142342

(51) Int. Cl.
*G02B 7/02*   (2006.01)
(52) U.S. Cl.
USPC ......................................... 359/824; 359/811
(58) Field of Classification Search
USPC ................................... 359/694–704, 811–830
See application file for complete search history.

(56) References Cited

U.S. PATENT DOCUMENTS 6,870,305 B2 *  3/2005  Moler ........................... 310/328
8,049,971 B2 * 11/2011  Jung et al. ..................... 359/694

FOREIGN PATENT DOCUMENTS

| JP | A-58-148682  | 9/1983 |
| JP | A-61-185081  | 8/1986 |
| JP | A-2008-72831 | 3/2008 |
| JP | A-2008-193874| 8/2008 |

OTHER PUBLICATIONS

Aug. 3, 2010 International Search Report issued in International Patent Application No. PCT/JP2010/060072.

* cited by examiner

*Primary Examiner* — Mohammed Hasan
(74) *Attorney, Agent, or Firm* — Oliff PLC

(57) ABSTRACT

A piezoelectric actuator includes: a first piezoelectric device between a base member and a moving member, and that is capable of being expanded and contracted in a direction in which the first piezoelectric device intersects with a first face that opposes the moving member of the base member; a second piezoelectric device between the first piezoelectric device and the moving member, and that is capable of being expanded and contracted in a direction different from the intersecting direction; a transfer member between the first piezoelectric device and the moving member that includes a through hole piercing through in the intersecting direction, receiving amounts of expansion and contraction of the first piezoelectric device and the second piezoelectric device to transfer a driving force to the moving member; and a supporting member that pierces through the through hole, and that can support the moving member.

8 Claims, 5 Drawing Sheets

PIEZOELECTRIC ACTUATOR, LENS-BARREL, AND CAMERA

TECHNICAL FIELD

The present invention relates to a piezoelectric actuator.

BACKGROUND ART

A piezoelectric actuator causes an electromechanical conversion element to expand and contract with a driving signal and produces progressive vibration waves (hereinafter referred to as progressive waves) at a driving surface of an elastic body with the expansion and contraction. The piezoelectric actuator produces elliptical motions at the driving surface with the progressive waves and drives a relative movement member in pressure contact with wave crests to output a driving force (see Patent Document 1).

[Patent Document 1] Japanese Unexamined Patent Application, Publication No. S58-148682

DISCLOSURE OF THE INVENTION

Problems to be Solved by the Invention

However, because a piezoelectric actuator of the related art utilizes elliptical motions, friction and abrasion occur at contact portions and speed control is complicated.

An object of the present invention is to provide a piezoelectric actuator in which friction and abrasion tend not to occur, and a lens barrel and camera that use this piezoelectric actuator.

Means for Solving the Problems

In a first aspect of the invention, a piezoelectric actuator is provided, which includes: a first piezoelectric element, which is disposed between a base member and a moving member, configured to be expandable and contractible in an intersecting direction intersecting a first surface of the base member, the first surface being opposite to the moving member; a second piezoelectric element, which is disposed between the first piezoelectric element and the moving member, configured to be expandable and contractible in a direction different from the intersecting direction; a transfer member, which is disposed between the first piezoelectric element and the moving member and includes a through hole penetrating in the intersecting direction, receiving amounts of expansion and contraction of the first piezoelectric element and the second piezoelectric element to transfer a driving force to the moving member; and a support member that penetrates through the through hole and is capable of supporting the moving member.

In a second aspect of the invention, the piezoelectric actuator of the first aspect is provided, in which the moving member moves along a direction of the expansion and contraction of the second piezoelectric element.

In a third aspect of the invention, the piezoelectric actuator of the first or second aspect is provided, in which the transfer member includes a first member and a second member: the first member, which is disposed in contact with the first piezoelectric element, being driven in the intersecting direction by the expansion and contraction of the first piezoelectric element; and the second member, which is disposed in contact with the second piezoelectric element, being moved in the direction different from the intersecting direction by the expansion and contraction of the second piezoelectric element.

In a fourth aspect of the invention, the piezoelectric actuator of the third aspect is provided, in which the second piezoelectric element includes one face opposite to another face in contact with the second member and the one face is in contact with the first member.

In a fifth aspect of the invention, the piezoelectric actuator of any one of the first to fourth aspects is provided, in which the first piezoelectric element is disposed at the first face of the base member.

In a sixth aspect of the invention, the piezoelectric actuator of any one of the first to fifth aspects is provided, in which the second piezoelectric element includes a plurality of elements.

In a seventh aspect of the invention, the piezoelectric actuator of any one of the first to sixth aspects is provided, in which the moving member is supported by the support member when the first piezoelectric element contracts, and the moving member is supported by the transfer member when the first piezoelectric element expands.

In an eighth aspect of the invention, a lens barrel is provided, which includes the piezoelectric actuator according to any one of the first to seventh aspects.

In a ninth aspect of the invention, a camera is provided, which includes the piezoelectric actuator according to any one of the first to seventh aspects.

Effects of the Invention

According to the present invention, the piezoelectric actuator in which friction and abrasion tend not to occur may be provided.

BRIEF DESCRIPTION OF THE DRAWINGS

FIG. 2A is a diagram of the piezoelectric actuator of FIG. 1 from which a moving member 12 is removed, and FIG. 2B is a diagram illustrating structure of a base member of the piezoelectric actuator of FIG. 1;

PREFERRED MODE FOR CARRYING OUT THE INVENTION

Figure 1:
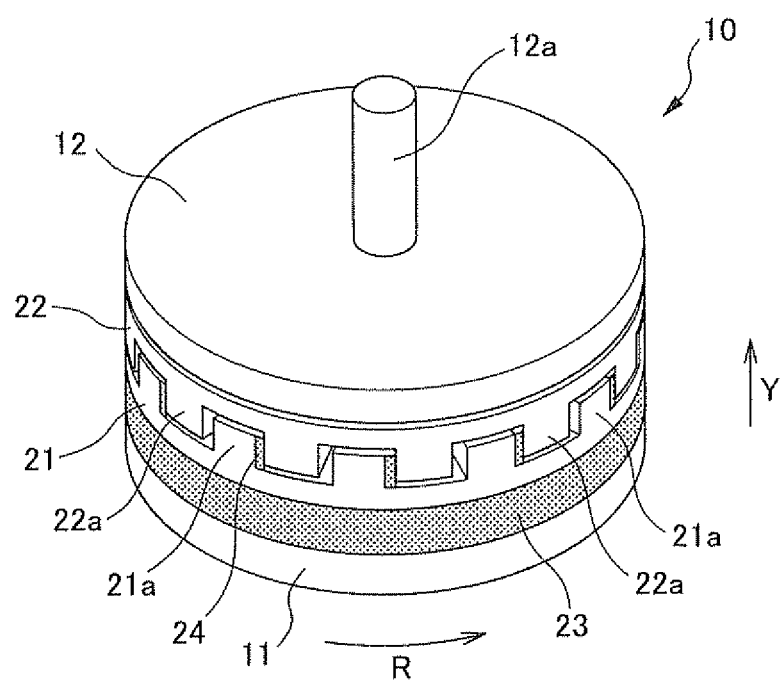
FIG. 1 is a diagram illustrating structure of a piezoelectric actuator according to an embodiment of the present invention.
Figure 2A:
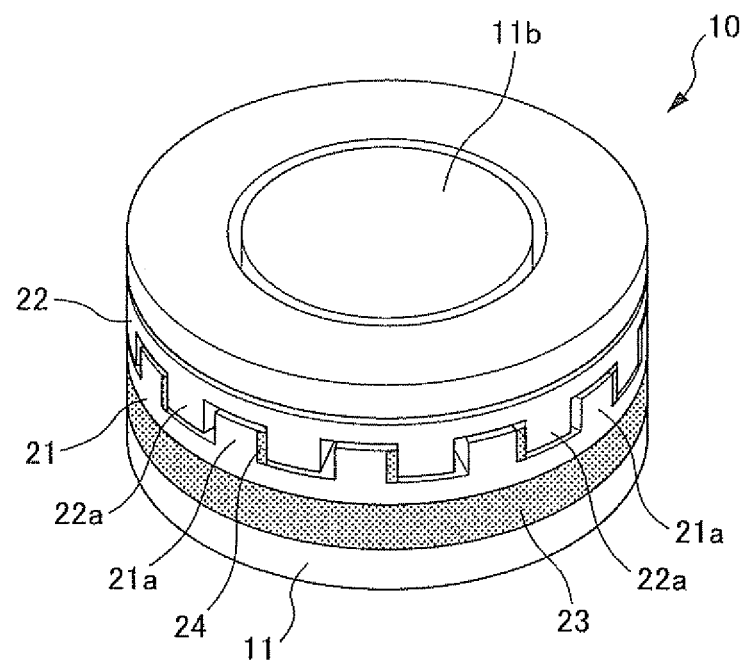
FIGS. 2A and 2B are diagrams illustrating structure of the piezoelectric actuator according to the embodiment of the present invention.
Figure 2B:
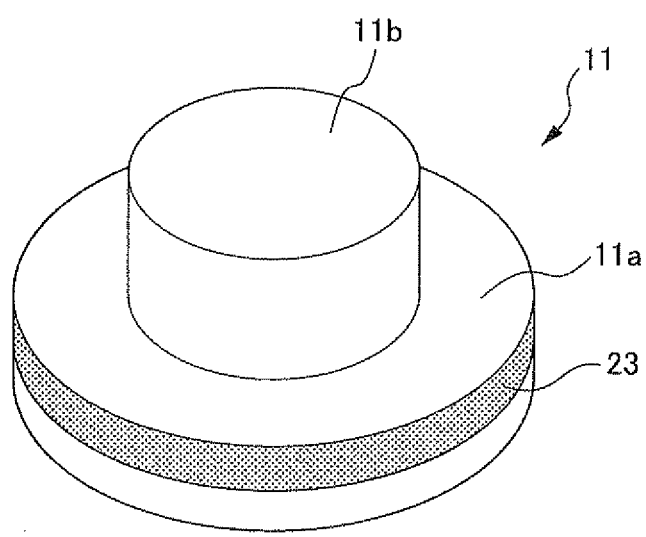

FIG. 1 and FIGS. 2A-2B are diagrams illustrating structure of a piezoelectric actuator according to an embodiment of the present invention. FIG. 1 is a diagram illustrating the structure of the piezoelectric actuator according to the embodiment. FIG. 2A is a diagram of the piezoelectric actuator of FIG. 1 from which the moving member 12 is removed, and FIG. 2B is a diagram illustrating structure of a base member of the piezoelectric actuator of FIG. 1.

Herebelow, descriptions based on FIG. 1 and FIGS. 2A-2B are given. A piezoelectric actuator 10 is structured with a base member 11, a lifter 21, a slider 22, a lift driving body 23, slide driving bodies 24 and the moving member 12.

The base member 11 has a circular disc shape and is provided with the lift driving body 23 at a circular surface 11a. The lift driving body 23 has a circular disc shape and is provided such that a tubular outer periphery face thereof is in line with a circumferential direction of the surface 11a of the base member 11.

The lifter 21 is disposed on the lift driving body 23. The lifter 21 has a circular disc shape with a through hole at a central portion thereof. A plurality of protrusion portions 21a are provided along the circumferential direction at an outer periphery side of the lifter 21. The lifter 21 is provided such that a bottom face thereof (a face opposite to the protrusion portions 21a) is in contact with the lift driving body 23 along the circumferential direction. The slide driving bodies 24 are provided at respective side faces of the protrusion portions 21a of the lifter 21. The side faces intersect the circumferential direction R.

The slider 22 has a circular disc shape with a through hole at a central portion thereof. A plurality of protrusion portions 22a are provided along the circumferential direction at an outer periphery side of the slider 22. The protrusion portions 22a are disposed so as to be in contact with the slide driving bodies 24 provided at the respective protrusion portions 21a of the lifter 21.

In the present embodiment, the lifter 21 and the slider 22 are members with the same shape. The slider 22 is disposed the opposite way round to the lifter 21 in a vertical direction (direction Y) of FIG. 1.

The moving member 12 is placed on an upper face of the slider 22 (a face opposite to the protrusion portions 22a). The moving member 12 has a circular disc shape. A rotary shaft 12a is provided extending upward in the direction Y of FIG. 1 from a central portion of the moving member 12. A gear or the like, which is a member for transmitting rotation of the moving member 12, is provided at the rotary shaft 12a.

A protrusion portion 11b with a cylindrical shape is provided at the base member 11, extending from a central portion thereof. The protrusion portion 11b penetrates through the through hole of the lifter 21 and the through hole of the slider 22, and an upper face of the protrusion portion 11b is in contact with the moving member 12. Thus, the protrusion portion 11b is configured to support the moving member 12.

The lift driving body 23 and the slide driving bodies 24 are respectively piezoelectric elements that are constituted of a piezoelectric ceramic with a piezoelectric effect or the like. Electrodes are formed at a cylindrical inner periphery face and outer periphery face of the lift driving body 23. Electrodes are formed at the slide driving bodies 24, at faces that are orthogonal to the circumferential directions of the annular shapes of the lifter 21 and the slider 22 (that is, faces in contact with the lifter 21 and faces in contact with the slider 22). The lift driving body 23 and the slide driving bodies 24 deform by predetermined amounts when voltages are applied to the electrodes. At such times, the lift driving body 23 deforms in a height direction of the tubular shape (direction Y in FIG. 1), and the slide driving bodies 24 deform in directions tangential to the circumferential directions of the annular shapes of the lifter 21 and the slider 22 (direction R in FIG. 1). That is, the lift driving body 23 and the slide driving bodies 24 expand and contract in predetermined directions in response to voltages applied to the electrodes being turned on and off (expanding when the voltages are on and contracting when the voltages are off), and thus perform driving operations. The voltages are applied to the lift driving body 23 and the slide driving bodies 24, respectively, from a driving circuit equipped with a control device. Thus, driving of the lift driving body 23 and the slide driving bodies 24 is controlled by the control device.

The piezoelectric element forming the lift driving body 23 is a piezoelectric element in which displacements are principally caused by the d31 piezoelectric effect. That is, the lift driving body 23 is polarized in a radial direction of the cylindrical shape, and has the property of expanding and contracting more easily (that is, performing significant displacement) in a direction orthogonal to the polarization direction (direction Y in FIG. 1) than in a direction parallel to the polarization direction. Thus, the lift driving body 23 expands and contracts in the direction Y through control performed by the control device, and causes the lifter 21 to move relative to the base member 11 with a predetermined stroke in the direction Y.

The piezoelectric element forming each slide driving body 24 is a piezoelectric element in which displacements are principally caused by the d33 piezoelectric effect. That is, the slide driving body 24 is polarized in a direction tangential to the circumferential direction (direction R), and has the property of expanding and contracting more easily (that is, performing significant displacement) in a direction parallel to the polarization direction (a direction tangential to the direction R) than in directions orthogonal to the polarization direction. Thus, the slide driving body 24 expands and contracts in the direction tangential to the circumferential direction (direction R) through control performed by the control device, and causes the slider 22 to move relative to the lifter 21 with a predetermined stroke in the direction tangential to the circumferential direction (direction R).

As described above, driving the lift driving body 23 drives the lifter 21 to move relative to the base member 11 with the predetermined stroke in the direction Y, and driving the slide driving bodies 24 drives the slider 22 to move relative to the lifter 21 with the predetermined stroke in directions tangential to the circumferential direction (direction R).

In the piezoelectric actuator 10 with the structure described above, the voltages applied to the lift driving body 23 and the slide driving bodies 24 are controlled by the control device, and the moving member 12 is controlled to move continuously. As a result, the moving member 12 performs rotational movement in the circumferential direction R.

Figure 3A:
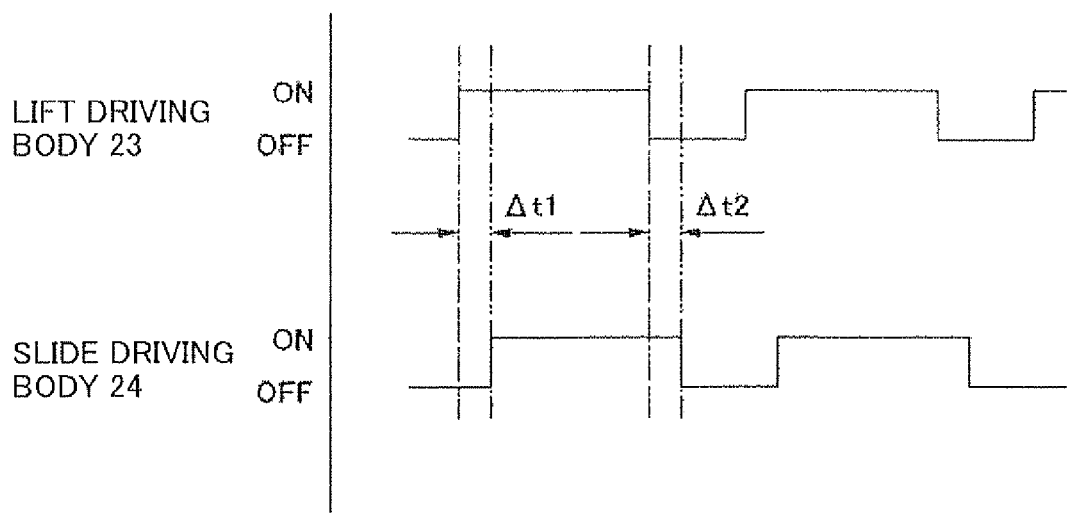
FIGS. 3A and 3B are timing charts describing operations of the piezoelectric actuator according to the embodiment.
Figure 3B:
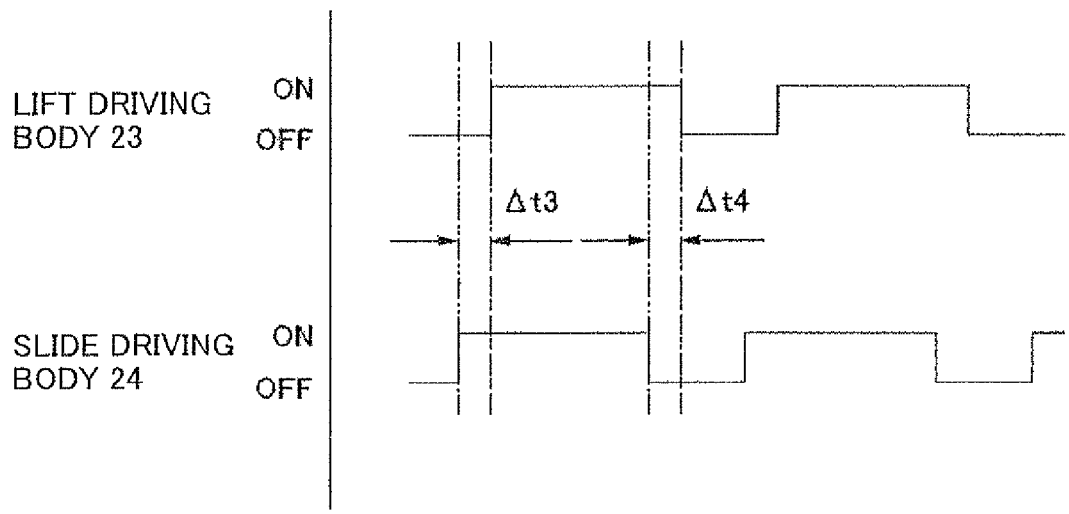

Next, control performed by the control device that drives the moving member 12 to move continuously is described with reference both to the aforementioned FIG. 1 and FIGS. 2A-2B and to FIGS. 3A-3B and FIGS. 4A-4D. FIGS. 3A and 3B are timing charts describing operation of the piezoelectric actuator 10. FIG. 3A shows an example of driving the moving member 12 in the direction of arrow R, and FIG. 3B shows an example of driving the moving member 12 in a direction opposite to the direction of arrow R. FIGS. 4A to 4D are diagrams giving a step-by-step description of operations of the piezoelectric actuator 10, and are an example in which the moving member 12 is driven in the direction of arrow R.

Figure 4A:
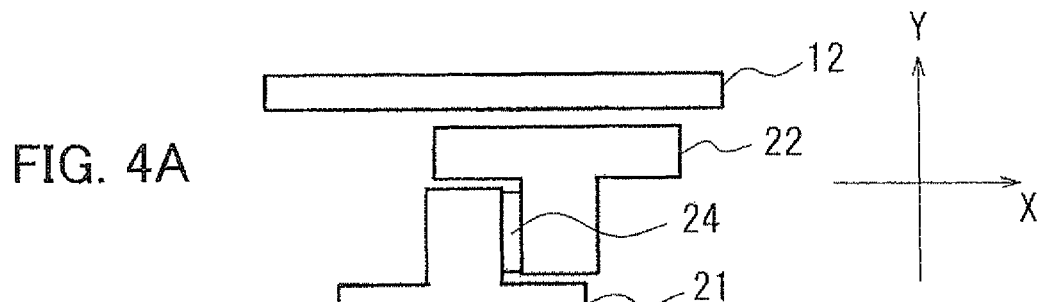
FIGS. 4A to 4D are diagrams giving a step-by-step description of operations of the piezoelectric actuator according to the embodiment.

FIG. 4A shows a non-driven state, in which the lift driving body 23 and the slide driving body 24 are in contracted states. In this state, the moving member 12 is supported by the protrusion portion 11b of the base member 11. Therefore, the upper face of the slider 22 and the bottom face of the moving member 12 are not in contact with each other but separated from each other.

Figure 4B:
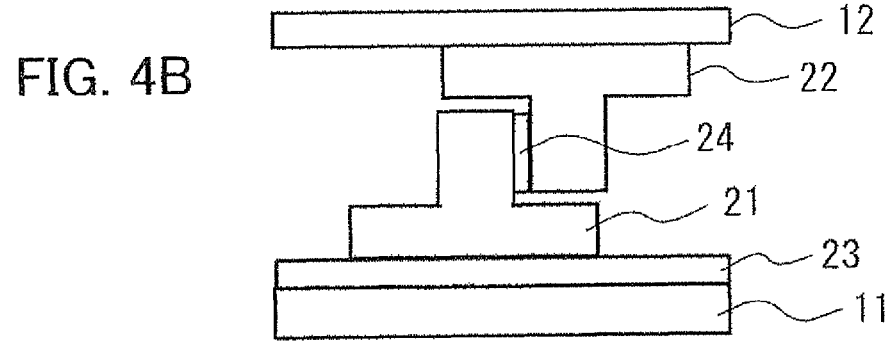
Figure 4C:
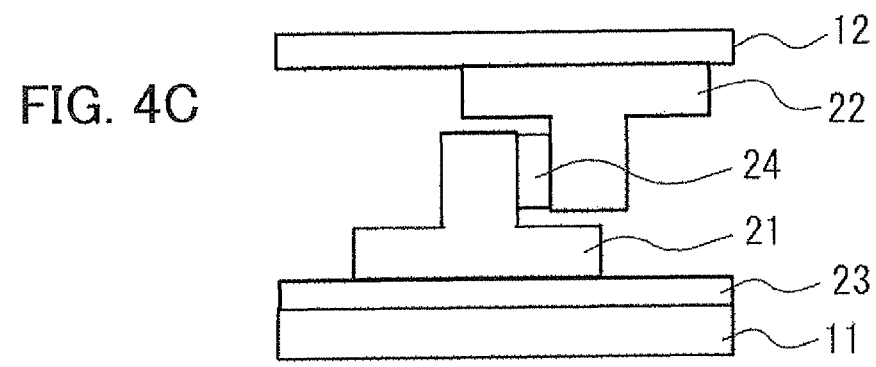

First, from the non-driven state shown in FIG. 4A, the lift driving body 23 is driven (turned on). Thus, as shown in FIG. 4B, the upper face of the slider 22 and the bottom face of the moving member 12 come into contact with each other. That is, the moving member 12 having been supported by the protrusion portion 11b goes into a state of being supported by the slider 22. In a predetermined period (Δt1) after the driving of the lift driving body 23, the slide driving body 24 is driven (turned on). Thus, as illustrated in FIG. 4C, the driven slide driving body 24 causes the slider 22 to move in a +X direction (the direction tangential to the circumferential direction R of FIG. 1). As a result, the moving member 12 supported by the slider 22 moves in the +X direction by an amount of the movement stroke of the slider 22 that is caused by the slide driving body 24.

Figure 4D:
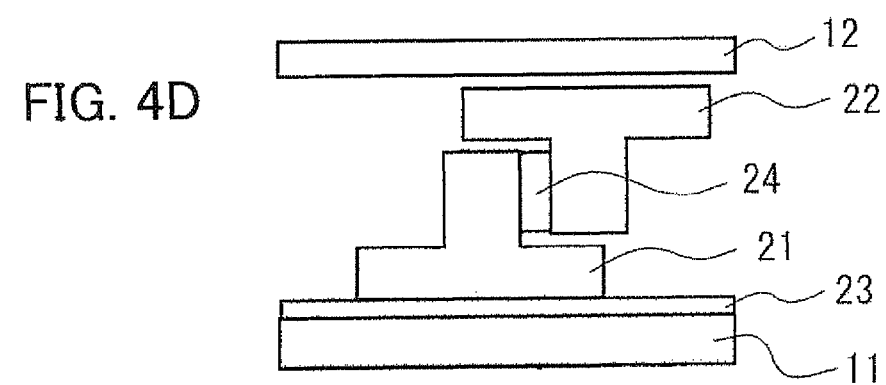

Subsequently, the driving of the lift driving body 23 is stopped (turned off). Thus, as illustrated in FIG. 4D, the retention of the moving member 12 by the slider 22 is released and the moving member 12 is supported by the protrusion portion 11b. That is, the upper face of the slider 22 and the bottom face of the moving member 12 return to be separated from each other. Then, in a predetermined duration (Δt2) after the driving of the lift driving body 23 has been stopped (turned off), the driving of the slide driving body 24 is stopped (turned off). Thus, the slider 22 returns to the non-driven position shown in FIG. 4A. When the slider 22 is returning to the non-driven position, the slider 22 is not supporting the moving member 12 and does not cause the moving member 12 to move. Thereafter, by the steps described above being repeated at a rapid rate, the moving member 12 may be driven to move smoothly in the +X direction.

The steps described above are an example of driving the moving member 12 in the +X direction. The moving member 12 may be driven in a −X direction by the lift driving body 23 and slide driving body 24 being driven as in the timing chart illustrated in FIG. 3B. That is, from the non-driven state shown in FIG. 4A, the slide driving body 24 is driven (turned on), and in a predetermined duration (Δt3), the lift driving body 23 is driven (turned on). Thus, the moving member 12 is supported by the slider 22.

Next, the driving of the slide driving body 24 is stopped (turned off). Thus, the slider 22 is operated to move in the −X direction, and the moving member 12 moves in the −X direction by an amount of the movement stroke of the slider 22 that is caused by the slide driving body 24.

In a predetermined duration (Δt4) after the driving of the slide driving body 24 is stopped, the driving of the lift driving body 23 is stopped (turned off), and the retention of the moving member 12 by the slider 22 is released. Hence, the slider 22 returns to the non-driven state shown in FIG. 4A in which the moving member 12 is supported by the protrusion portion 11b.

By the steps described above being repeated, the moving member 12 may be driven to move in the −X direction.

(1) In the structure of the present embodiment, the moving member 12 is supported by driving of the lift driving body 23, and the thus supported moving member 12 is operated to move by driving of the slide driving bodies 24. That is, the respective directions of actions of the lift driving body 23 and the slide driving bodies 24 match directions in which the moving member 12 is operated, and the two actions are implemented independently. Velocities (speeds and directions) of forces relating to the respective operations are constant. Thus, unwanted relative displacements (rubbing) are not caused by changes in velocity between the slider 22 and the moving member 12. As a result, abrasion due to rubbing may be suppressed.

(2) Support of the moving member 12 is implemented by the lift driving body 23 and movement operations of the moving member 12 are implemented by the slide driving bodies 24. The lift driving body 23 and the slide driving bodies 24 are not in contact with each other. Therefore, vibrations during driving of one driving body have very little effect on the other driving body. Since driving of support and driving of movement of the moving member 12 are completely separate, independent driving control is possible. Consequently, it is possible to provide a structure with a high degree of freedom of control and high driving accuracy.

(3) The plural protrusion portions 21a and 22a with which the slide driving bodies 24 are in contact are formed at the lifter 21 and the slider 22, respectively, and are respectively structured as integrated members. Thus, even if there are errors in respective displacement amounts of the slide driving bodies 24, respective driving amounts of the protrusion portions 22a of the slider 22 are averaged. Therefore, it may be possible to decrease errors in the respective displacement amounts of the slide driving bodies 24 to have little effect on the driving amounts of the slider 22, thereby increasing control performance.

Figure 5:
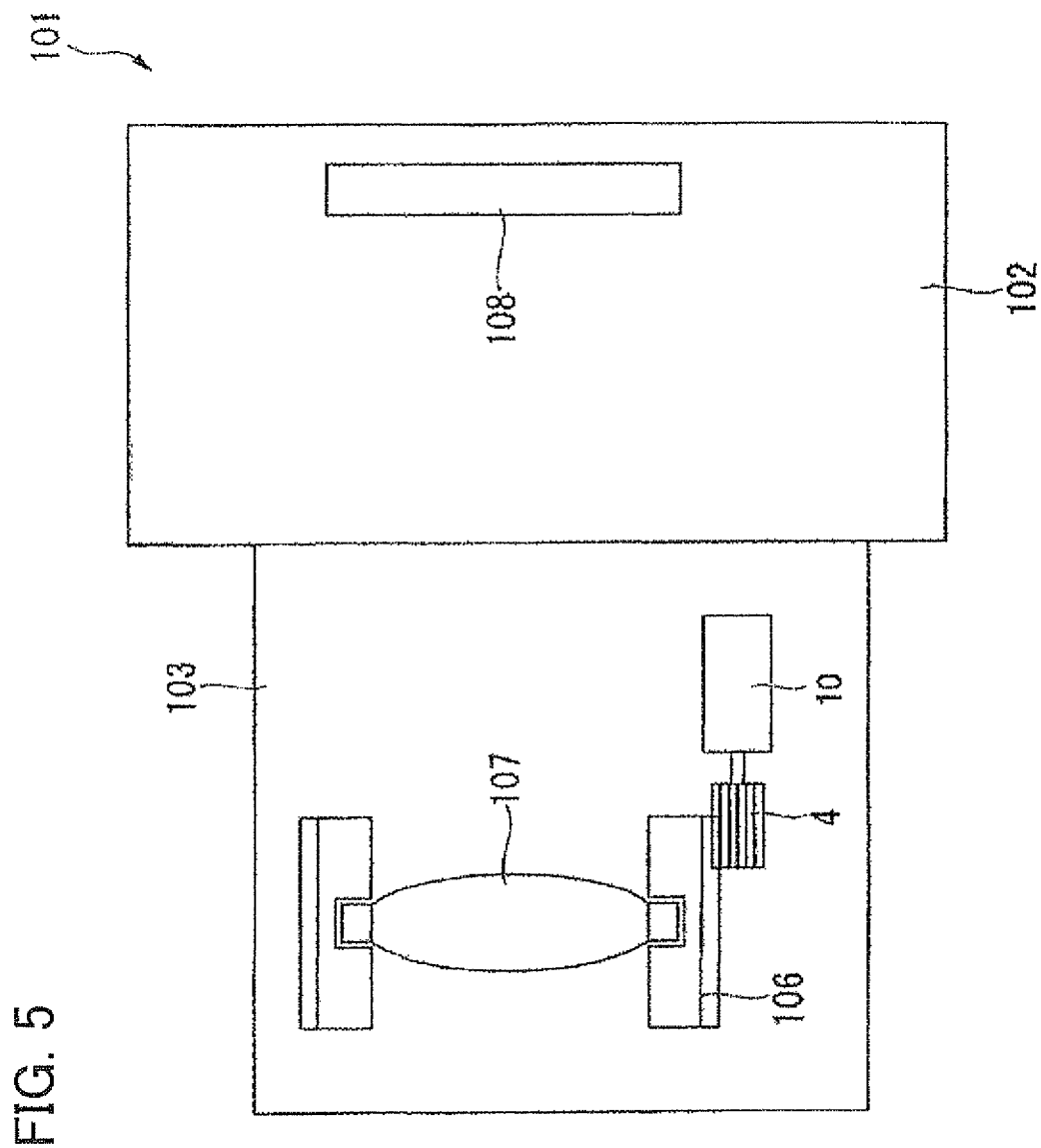
FIG. 5 is a diagram illustrating structure of a lens barrel and camera provided with the piezoelectric actuator according to the embodiment.

FIG. 5 is a schematic structural diagram illustrating general structure of a camera 101 of the present embodiment.

As illustrated in FIG. 5, the camera 101 is provided with a camera body 102, in which an imaging device 108 is incorporated, and a lens barrel 103 including a lens 107.

The lens barrel 103 is an interchangeable lens which is attachable to and detachable from the camera body 102. The lens barrel 103 is provided with the lens 107, a cam tube 106, the piezoelectric actuator 10 and so forth. The piezoelectric actuator 10 is used as a drive source that drives the lens 107 during focusing operations of the camera 101. A driving force obtained from a gear 4, which is provided at the rotary shaft (the rotary shaft 12a in FIG. 1) of the moving member of the piezoelectric actuator 10, is directly transmitted to the cam tube 106. The lens 107 is retained in the cam tube 106. The lens 107 is a focusing lens that is moved substantially parallel to an optical axis direction L by the driving force produced by the piezoelectric actuator 10 to adjust a focus point.

During use of the camera 101, an image of an object is focused at an imaging plane of the imaging device 108 by a lens unit (including the lens 107) that is provided inside the lens barrel 103. The focused object image is converted to electronic signals by the imaging device 108, and these signals are A/D-converted. Thus, image data is obtained.

As mentioned above, the camera 101 and lens barrel 103 of the present embodiment are provided with the piezoelectric actuator 10 described in the embodiment described above. Thus, the cam tube 106 may be directly driven by the piezoelectric actuator 10 whose output efficiency is improved over the related art. Therefore, it is possible to reduce losses of energy and provide an energy-saving effect. In addition, the number of components may be reduced.

In the present embodiment, an example is illustrated in which the lens barrel 103 is an interchangeable lens, but this is not a limitation. For example, the piezoelectric actuator 10 may alternatively be used for driving of a lens that is integrated with a camera body.

In the present embodiment, the lift driving body 23 uses a piezoelectric element that expands and contracts in a direction orthogonal to the thickness direction thereof (a thickness-shear oscillation mode), and each slide driving body 24 uses a piezoelectric element that expands and contracts in the thickness direction thereof (a longitudinal oscillation mode). Alternatively, a longitudinal oscillation mode piezoelectric element may be used for the lift driving body 23 and a thickness-shear oscillation mode piezoelectric element may be used for each slide driving body 24. In this case, the lift driving body 23 of FIG. 1 is used for driving the lifter 21 in the circumferential direction R and the slide driving bodies 24 are used for driving the slider 22 in the vertical direction (direction Y). That is, the movements of the lift driving body and the slide driving bodies are swapped, and the movements of the lifter and the slider are swapped. Accordingly, the controls of the lift driving body and the slide driving bodies of the embodiment described above may be interchanged for this case.

EXPLANATION OF REFERENCE NUMERALS

10: piezoelectric actuator; 11: base member; 11a: surface; 11b: protrusion portion; 12: moving member; 21: lifter; 21a: protrusion portions; 22: slider; 22a: protrusion portions; 23: lift driving body; 24: slide driving bodies.

The invention claimed is:

1. A piezoelectric actuator comprising:
   a first piezoelectric element, which is disposed between a circular base member and a moving member, configured to be expandable and contractible in an intersecting direction intersecting a first surface of the base member, the first surface being opposite to the moving member;
   a plurality of second piezoelectric elements, which are disposed between the first piezoelectric element and the moving member along a circumferential direction of the base member, configured to be expandable and contractible in the circumferential direction;
   a transfer member, which is disposed between the first piezoelectric element and the moving member and includes a through hole penetrating in the intersecting direction, receiving amounts of expansion and contraction of the first piezoelectric element and the plurality of second piezoelectric elements to transfer a driving force to the moving member; and
   a support member that penetrates through the through hole and is capable of supporting the moving member.

2. The piezoelectric actuator according to claim 1, wherein the moving member moves along a direction of the expansion and contraction of the plurality of second piezoelectric elements.

3. The piezoelectric actuator according to claim 1, wherein the transfer member comprises a first member and a second member:
   the first member, which is disposed in contact with the first piezoelectric element, being driven in the intersecting direction by the expansion and contraction of the first piezoelectric element; and
   the second member, which is disposed in contact with the plurality of second piezoelectric elements, being moved in the direction different from the intersecting direction by the expansion and contraction of the plurality of second piezoelectric elements.

4. The piezoelectric actuator according to claim 3, wherein the plurality of second piezoelectric elements include one face opposite to another face in contact with the second member and the one face is in contact with the first member.

5. The piezoelectric actuator according to claim 1, wherein the first piezoelectric element is disposed at the first face of the base member.

6. The piezoelectric actuator according to claim 1, wherein the moving member is supported by the support member when the first piezoelectric element contracts, and the moving member is supported by the transfer member when the first piezoelectric element expands.

7. A lens barrel comprising the piezoelectric actuator according to claim 1.

8. A camera comprising the piezoelectric actuator according to claim 1.

* * * * *